June 15, 1943.  R. T. WHITNEY  2,322,079
BRAKE DEVICE
Filed June 27, 1942   2 Sheets-Sheet 2
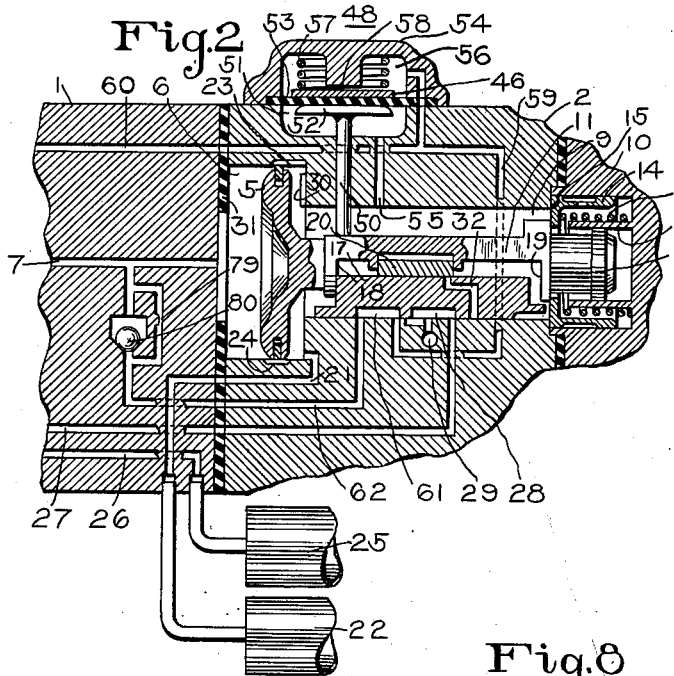
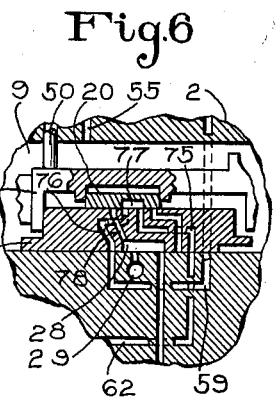
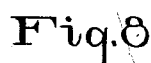
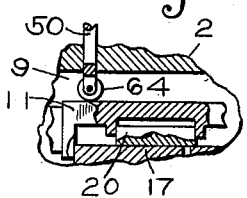
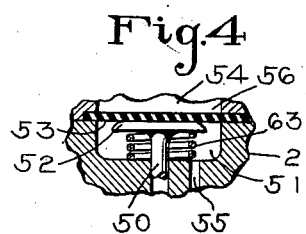
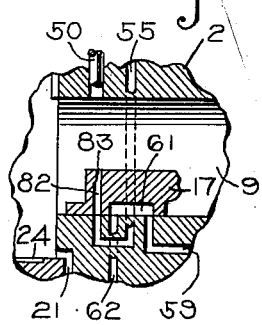
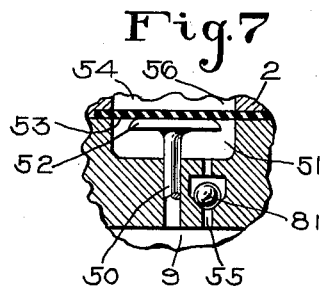
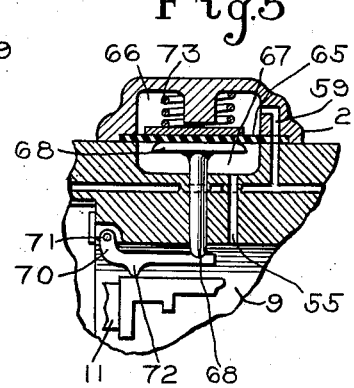
INVENTOR
Ralph T. Whitney
BY
ATTORNEY Patented June 15, 1943

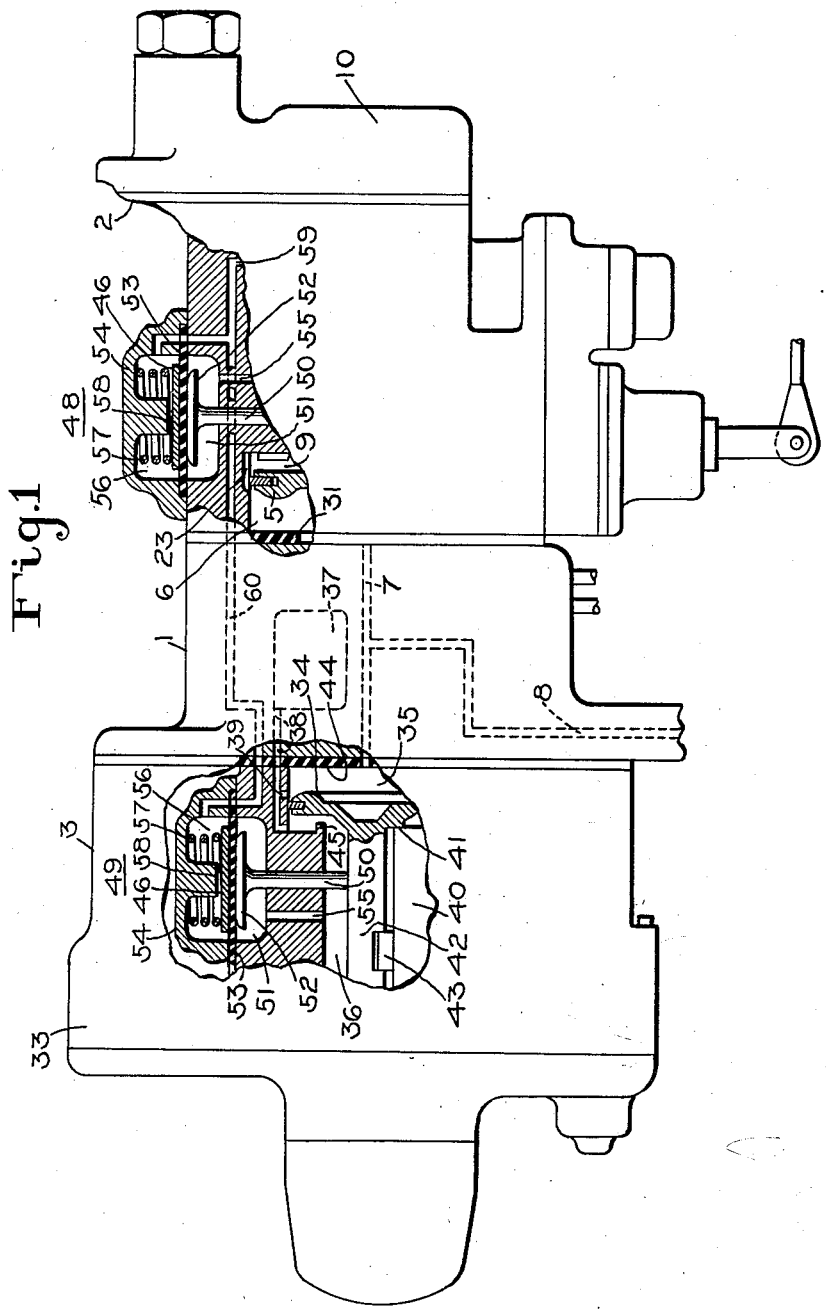

2,322,079

UNITED STATES PATENT OFFICE 2,322,079

BRAKE DEVICE

Ralph T. Whitney, Irwin, Pa., assignor to The Westinghouse Air Brake Company, Wilmerding, Pa., a corporation of Pennsylvania Application June 27, 1942, Serial No. 448,726

27 Claims. (Cl. 303—1)

This invention relates to brake devices and more particularly to the type employed on railway vehicles in connection with fluid pressure brake systems.

In certain air brake devices used on railway vehicles, pistons subject to the pressure of fluid in a control pipe, such as a brake pipe, and an opposing pressure are arranged to operate upon a slight change in pressure in the control pipe with respect to the opposing pressure to apply the brakes on the vehicles, release the brakes, or to accomplish other desired results. These pistons reciprocate in a bore and in accordance with usual practice the head of the pistons is of a diameter somewhat less than that of the respective bore and is therefore provided with a peripheral ring groove carrying a ring which is expanded into contact with the wall of the bore to provide a leak tight seal between the piston and wall.

Due to the fact that the diameter of the piston head is slightly less than that of the bore in which it operates, the piston head is capable of a certain degree of radial movement relative to the wall of said bore. This movement is slight and resisted by friction between the ring and side wall of the ring groove in the piston head. Nevertheless, in a brake device applied to a railway vehicle vibration, due for instance to the vehicle wheels striking uneven joints between the rails in a track, is liable to cause such relative movement between the piston head and ring and thereby the wall of the piston bore as to undesirably create hammer-like blows between the piston head and said wall. In time these blows may result in grooves being formed in the wall of the bore where the piston head engages same at either side of the ring. In case the piston is arranged to move horizontally, such grooves may be formed in the cylinder wall only at one side of the piston as below the piston, but if the axis of the piston is vertical, the grooves may be annular in form around the whole wall. In a brake device applied to a vehicle and arranged to be controlled by variations in pressure in a brake pipe, this grooving of the piston cylinder wall is most likely to occur in the normal or brake release position of the piston since the piston occupies this position the major portion of the time that the vehicle is in use.

Grooving of the wall of a piston bore is of course very objectionable, and particularly in air brake devices, because it tends to create or increase leakage of fluid under pressure from one side of the piston to the other and thereby reduce the sensitivity of the piston to a variation in fluid pressure, and in case the leakage becomes sufficient it might even cause the piston to fail to operate. Moreover, in case the wall of the piston bore should become grooved, the piston head or ring is liable to catch on one side of the groove so that the piston will require a greater than normal differential between the pressures acting on its opposite faces to start moving out of its normal position, and this is undesirable in that when the piston once starts moving it may jump or overtravel a desired position and cause an undesired operation.

One object of the invention is therefore the provision of means for holding the head of a piston against radial movement relative to the wall of the bore in which it operates so as to thereby prevent grooving of said wall, as above described.

Another object of the invention is the provision of means for urging a piston head into contact with one side of the wall of the bore in which it operates with a force sufficient to prevent relative radial movement between the piston head and wall to thereby prevent grooving of the wall.

In a brake controlling valve device such as employed in the well known "AB" brake equipment now standard for use on freight cars on American railroads, there is a service piston and an emergency piston both of which are controlled by brake pipe pressure and an opposing pressure. Each of these pistons and certain parts controlled thereby is so designed as to move upon a slight reduction in brake pipe pressure below the opposing pressure such as one-half pound, out of its normal position to accomplish a desired operation. In order that these pistons will still operate upon the slight changes in pressure intended with a vibration preventing means such as defined in the above objects employed for urging the piston heads into contact with the wall of their bores, it is therefore necessary that this urging force be removed from the piston heads at or before the time the differential in fluid pressures is obtained on the piston which the piston was designed to respond to.

Another object of the invention is therefore the provision of means for removing the vibration preventing force from the piston head upon initiating a reduction in brake pipe pressure so that the piston will respond to the usual and intended relatively small reduction in brake pipe pressure above mentioned.

Another object of the invention is the provision of means arranged to urge a piston head such as employed in the "AB" brake, into contact with the wall of the piston bore when the piston is in release position with a sufficient degree of force to hold the piston head against radial movement relative to said bore, and also operable to relieve the piston head of this urging force at least by the time the brake pipe pressure is reduced to a gree which the piston is intended to respond to and to then maintain the piston head relieved of this force until it is returned to its normal position, so as to in no way interfere with the intended sensitivity of the piston to a variation in pressure and thereby the desired operation of the device.

Other objects and advantages will be apparent from the following more detailed description of the invention.

In the accompanying drawings; Fig. 1 is an elevational view partly in section but mainly in outline of an "AB" brake device embodying the invention; Fig. 2 is an enlarged sectional view of a portion of the "AB" brake device shown in Fig. 1 and illustrating in detail one embodiment of the invention; and Figs. 3 to 8 are sectional views of a portion of the device shown in Fig. 2 and embodying different modifications of the invention.

Description

The "AB" brake device shown in Fig. 1 and in part in Fig. 2 and employed merely for illustrating one use of the invention, may, except for the addition of the invention, be identical to that disclosed and described in Patent No. 2,031,213, issued on February 18, 1936, to Clyde C. Farmer. Since reference may be made to this patent only those parts of the structure of the "AB" brake device have therefore been shown in the drawings which are deemed necessary to provide a clear comprehensive understanding of the invention when taken with the brief description of said device to follow.

As shown in the drawings, the brake device comprises a pipe bracket 1 having two oppositely disposed mounting faces upon one of which is secured a service application valve device 2 while on the other is secured an emergency application valve device 3.

The service application valve device comprises a casing containing a service piston 5 having at one side a chamber 6 connected through passages 7 and 8 to a brake pipe (not shown). At the opposite side of the piston 5 is a valve chamber 9 the outer end of which is closed by a cover 10. The piston 5 has a stem 11 extending through the valve chamber 9 and having on its outer end a cylindrical guide 12 slidably mounted in a sleeve-like extension 13 of the cover 10. The cover 10 has an annular chamber encircling the extension 13 and in which is slidably mounted a plunger 14. This chamber is of greater diameter than valve chamber 9 so as to provide a shoulder 15 for engagement by the plunger 14. A spring 16 is interposed between plunger 14 and cover 10 for urging the plunger into contact with shoulder 15 and for opposing movement of the plunger away from said shoulder.

The valve chamber 9 contains a main slide valve 17 loosely mounted between two spaced shoulders 18 and 19 provided on the piston stem 11. An auxiliary slide valve 20 is also disposed in valve chamber 9 on top of the main slide valve 17 and the piston stem 11 is provided with two shoulders engaging opposite ends of the slide valve 20 for moving same with the piston 5.

The valve chamber 9 is in constant communication through a passage and pipe 21 with an auxiliary reservoir 22 which is arranged to be charged with fluid under pressure from the brake pipe by way of piston chamber 6 and two feed grooves 23 and 24 connecting said chamber to the valve chamber 9, when the piston 5 is in its normal release position shown.

The reference numeral 25 indicates a brake cylinder device for applying the brakes on a vehicle and this device is connected by way of a passage and pipe 26 and a communication (not shown) in the emergency application valve device 3 to a passage 27 which leads to the seat of the main slide valve 17. The slide valve 17 is provided with a cavity 28 to connect passage 27 to an atmospheric exhaust passage 29 when said slide valve is in its release position, shown in Fig. 2, for effecting a release of fluid under pressure from the brake cylinder device 25 to effect a release of brakes.

The piston 5 and slide valve 17 also have an inner release position defined by engagement between said piston and stops 30 provided in the casing. In this inner position communication through the feed groove 24 is closed to reduce charging of the auxiliary reservoir 21 from the brake pipe to a rate limited by the feed groove 23. Also, in this inner release position the brake cylinder release communication just described is maintained open by way of cavity 28 in the main slide valve 17, as will be apparent from the drawing. Movement of the piston 5 and slide valve 17 to this inner release position is opposed by the pressure of spring 16 on the plunger 14. Upon substantial equalization of the pressures of fluid in the brake pipe and the auxiliary reservoir, acting on opposite faces of the piston 5, the spring 16 is arranged to return said piston to its normal position shown in which both the feed grooves 22 and 23 are again open around the piston. This return of the piston to its normal release position under the action of spring 16 will also return the main slide valve 17 substantially to its normal position shown.

The piston 5 and auxiliary slide valve 20 are so designed as to move out of their normal release positions shown relative to the main slide valve 17 to a quick service position when the brake pipe pressure in chamber 6 is reduced for instance one-half pound below the opposing auxiliary reservoir pressure in valve chamber 9. Upon a service rate of reduction in brake pipe pressure this movement of the auxiliary slide valve will open in the quick service position a quick service venting communication (not shown) from the brake pipe for effecting a local quick service reduction in brake pipe pressure for propagating serially through a train the service brake action. A further reduction in brake pipe pressure below the opposing auxiliary reservoir pressure will then cause further movement of the piston to a brake application position defined by contact between the piston and a gasket 31 interposed between pipe bracket 1 and the casing of the service application valve device. Upon this further movement of piston 5 and the auxiliary slide valve 20 the piston stem 11 engages the end of the main slide valve 17 and pulls said valve to a brake application position.

When shoulder 19 on the piston stem engages the main slide valve 17, the auxiliary slide valve 30 opens a service port 32 to valve chamber 9 and when the main slide valve obtains its brake application position said port is connected to passage 27 in the slide valve seat, and fluid under pressure from the auxiliary reservoir 21 will then flow through said port to passage 27 and thence by way of the emergency valve device 2 through the communication (not shown) and passage 26 to the brake cylinder device 25 for applying the brakes.

If the reduction in brake pipe pressure is of a degree less than a full service reduction, then when the pressure of fluid in the auxiliary reservoir and valve chamber 9 becomes reduced by flow to the brake cylinder device to a degree slightly less than the opposing brake pipe pressure in piston chamber 6, the differential thus created on the piston 5 will move said piston and the auxiliary slide valve 20 back in the direction of their normal positions until shoulder 18 on the piston stem engages the adjacent end of the main slide valve 17, in which position, known as lap position, movement of the piston and auxiliary slide valve will cease. In lap position the auxiliary slide valve 20 laps service port 32 so as to prevent further flow of fluid under pressure from the auxiliary reservoir to the brake cylinder device so as to thereby limit the degree of brake application in accordance with the degree of reduction in brake pipe pressure.

From the above description it will be seen that the service piston 5 has a normal release position as shown in the drawing, an inner release position defined by contact between the piston and stops 30, a quick service position, a service position defined by contact of the piston 5 with a gasket 31 and a service lap position in which the service port 32 is lapped by the auxiliary slide valve 18 while in registration with the brake cylinder passage 27.

The emergency application valve device 2 comprises a casing containing an emergency piston 34 having at one side a chamber 35 connected to the brake pipe through passages 7 and 8 and having at the opposite side a valve chamber 36 connected to a quick action chamber 37 provided in the pipe bracket 1 by way of a passage 38. The passage 38 is open to the piston chamber 35 through a feed port 39 when the piston 34 is in its normal position shown in the drawings to provide for charging of the valve chamber 36 and quick action chamber 37 with fluid at brake pipe pressure supplied to piston chamber 35.

The valve chamber 36 contains a main slide valve 40 loosely mounted between two spaced shoulders 41 (only one of which is shown) provided on a stem 42 projecting through the valve chamber 36 from the piston 34. An auxiliary slide valve 43 is mounted to slide on the main slide valve 40 and is disposed in a recess in the piston stem 42 for movement with the piston.

Upon a service rate of reduction in brake pipe pressure in piston chamber 35 the emergency piston 34 is arranged to move the auxiliary slide valve 43 relative to the main slide valve 40 to a service position in which a communication (not shown) is opened between the valve chamber 36 and the atmosphere for reducing the pressure in said chamber and in the quick action chamber 37 at the same rate as the brake pipe pressure is reduced so as to prevent further movement of the piston upon such a reduction in brake pipe pressure.

In case the reduction in brake pipe pressure in piston chamber 35 is at an emergency rate then the venting communication from valve chamber 36 and quick action chamber 37 opened by the auxiliary slide valve in its service position is unable to reduce the pressure in said chambers as rapidly as the brake pipe pressure is reduced, in which case the emergency piston 34 will continue to move the auxiliary slide valve 43 past its service position to an emergency position for supplying fluid under pressure from valve chamber 36 and quick action chamber 37 to a brake pipe vent valve device 33 for effecting operation thereof to initiate a sudden local emergency rate of reduction in brake pipe pressure for propagating emergency action through a train. The piston 34 then responds to this emergency reduction in brake pipe pressure to move the main slide valve 40 to a position defined by contact between the piston and a gasket 44 for effecting an emergency application of brakes.

Upon a subsequent increase in pressure in the brake pipe and thereby in the service piston chamber 6 and emergency piston chamber 35 for effecting a release of brakes, such increase acting on the emergency piston 34 is adapted to return same and thereby the slide valves 43 and 40 to their normal positions shown.

At the head end of a train where the increase in brake pipe pressure is normally at a relatively rapid rate a sufficient differential in pressures may be provided on the piston 34 to cause movement of said piston through its normal position into contact with a stop 45 against the opposing pressure of a spring acting on a plunger (not shown, but like the spring 16 and plunger 14 acting on the service piston 5 as shown in Fig. 2) to what is known as a back-dump position for establishing a communication between the brake cylinder device 25 and brake pipe. Through this communication fluid is arranged to flow from the brake cylinder device back to the brake pipe to effect a sudden local increase in brake pipe pressure for causing like operation of the emergency valve device on the adjacent car to the rear in a train and so on serially through the train in order to attain a quick release of brakes and recharging of the brake system subsequent to an emergency application of brakes.

In the inner or back dump position of the emergency piston 34, as in the normal position shown, fluid from the brake pipe flows through the port 39 into the valve chamber 36 and quick action chamber 37 and when the pressure in these chambers become sufficiently increased with respect to brake pipe pressure effective in chamber 35, the spring (not shown) acting on the emergency piston will return same to its normal position shown following which said chambers will become charged with fluid at the same pressure as effective in the brake pipe.

The operation of the emergency valve device 3 has been briefly described only to bring out the fact that, like the service piston 5 and the slide valves associated therewith, the emergency piston 34 has a normal position in which it is shown and several other positions which it is adapted to assume under different conditions of brake pipe pressure or brake control.

As above described, at substantially the time shoulder 19 on the service piston stem 11 contacts the adjacent end of the main slide valve 17, a quick service communication is opened through the auxiliary slide valve 18 for propagating quick service action serially through a train in order to accelerate a service application of brakes throughout the train. In a somewhat corresponding position, described above as service position, of the emergency piston 34 and auxiliary slide valve 43 associated therewith the service vent from the emergency valve chamber 36 and quick action chamber 37 is opened for reducing the pressure in said chambers at substantially the same rate as the brake pipe pressure is reduced, and like the service piston 5, the emergency piston 34 and auxiliary slide valve 43 are designed to operate as just mentioned when the brake pipe pressure is reduced for instance one-half pound below the pressure of fluid in valve chamber 36.

If due to vibration and relative movement between the service and emergency piston heads and the wall of the bores in which they operate, grooves should be formed in the walls, it will be seen that leakage might be attained past the pistons which would prevent them from responding to a reduction in brake pipe pressure as intended, or such grooves might even render said pistons inoperative. Still further, if the pistons remained operative, it will be seen that if the piston ring, or an edge of the piston head should catch against one edge of a groove formed in the piston bore, a greater than usual reduction in pressure in the brake pipe on one side of the piston would be required to start the piston moving. In the service application valve device this might result in failure to attain or propagate quick service action upon a service reduction in brake pipe pressure due to the fact that the greater than normal differential of pressures on the service piston 34 might move said piston and the slide valve to their application positions too quickly. In the emergency valve device similar accelerated movement of the emergency piston and auxiliary slide valve 43 might result in these parts overtraveling the service position to emergency position and causing an undesired emergency application of brakes upon a service reduction in brake pipe pressure and thereby an undesired stopping of a train.

From the above discussion it will therefore be seen that it is imperative to maintain the service and emergency pistons and the wall of the bores in which they operate in such condition as to assure intended response of said pistons to a reduction in brake pipe pressure. I attain this result by the provision of piston vibration preventing means or pressure device 48 and 49 in the service and emergency valve devices 2 and 3, respectively. The structure and operation of these devices will now be described.

The pressure device 48 comprises a plunger 50 which is slidably mounted in a bore provided through the casing of the service application valve device directly over the piston stem 11 close to the piston 5 and at right angles to the axis of the piston. This plunger extends into valve chamber 9 for contact with the piston stem 11 and also extends into a chamber 51 and is provided therein with a head 52 which engages one side of a flexible diaphragm 53 clamped between the casing and a cover 54. The chamber 51 below diaphragm 53 may be in constant communication through a port 55 with valve chamber 9 in the service application valve device. At the opposite side of diaphragm 53 is a chamber 56 containing a spring 57 acting on a plate 46 mounted against the diaphragm. A stop 58 in chamber 56 is arranged for engagement by plate 46 to limit deflection of the diaphragm in the direction of said chamber.

The pressure device 49 associated with the emergency application valve device 3 may be identical in structure to the pressure device 48, but in the pressure device 49 the plunger 50 is arranged to engage the emergency piston stem 42, and chamber 51 at the lower side of the diaphragm 53 is connected by port 55 to the emergency valve chamber 36.

The chamber 56 in the pressure device 48 associated with the service application valve device 2 is connected by a passage 59 to the seat of the main slide valve 17. Chamber 56 in the pressure device 49 associated with the emergency application valve device 3 may be connected by a passage 60 extending through the pipe bracket 1 to passage 59 leading to the seat of the slide valve 17. It will thus be seen that the pressure of fluid in chamber 56 in both the pressure devices 48 and 49 may if desired be arranged for control from the service slide valve 17. The service slide valve 17 is provided with a cavity 61 which in the normal release position of said valve is arranged to connect passage 59 to a passage 62 leading to the brake pipe passage 7. Thus when the brake pipe is charged with fluid under pressure and the service piston 5 and main slide valve 17 are in their normal positions shown, the diaphragm chamber 56 in both pressure devices 48 and 49 will also be charged with fluid at brake pipe pressure.

Chamber 51 below diaphragm 53 in the emergency application valve device is charged through passage 55 with fluid at the pressure in the quick action chamber 37 and valve chamber 36, while in the service application valve device the chamber 51 is charged with fluid at auxiliary reservoir pressure, which, with the brake equipment fully charged, is of the same degree as that in the brake pipe and also as that acting in valve chamber 36 of the emergency valve device 3. Thus with a brake equipment fully charged with fluid under pressure, the diaphragm 53 in both the pressure devices 48 and 49 will be in a state of equilibrium as to opposing fluid pressure and therefore the pressure of springs 57 on the diaphragms 53 will be transmitted through the plungers 50 to, respectively, the piston stem 11 in the service application valve device and piston stem 42 in the emergency application valve device for urging the heads of the two pistons 5 and 34 radially against one side of the wall of the respective piston bores. The pressure of springs 57 is preferably such as to exert only a sufficient force on the heads of the service and emergency pistons to hold them against radial movement relative to the wall of the bores in which they are disposed, upon vibration of the valve device such as above described. Since the heads of the pistons are thus held against radial vibration in their bores grooving of the walls of the bores will be prevented and the undesirable results above described which are possible due to grooving will be avoided.

It is desirable that springs 57 be effective to hold the heads of the service and emergency pistons against radial movement relative to the wall of the bores in which they operate only while the pistons are in their normal position shown, and it is also desirable that this force be removed from the piston heads at least by the time that brake pipe pressure acting on the pistons is reduced to that degree below the opposing fluid pressure which the pistons were designed to respond to. In other words, if the service and emergency pistons 5 and 34 were so designed as to start moving the auxiliary slide valves 20 and 43, respectively, out of their release positions upon a reduction in brake pipe pressure of for instance one-half pound below the opposing fluid pressure, it is desired that the force of the springs 57 be removed from the pistons at least by the time this differential in pressures is attained on the pistons.

This removal of the force of springs 57 is attained according to the invention by the proper proportioning of the areas of diaphragms 53 to the force of springs 57 and by subjecting the lower faces of said diaphragms to auxiliary reservoir pressure in the service application valve device 2 and to quick action chamber pressure in the emergency valve device 3 and by connecting the chamber 56 at the opposite side of said diaphragms to the brake pipe by way of cavity 61 in the service slide valve 17 when in its normal position. By this arrangement it will be seen that when the pressure in the brake pipe and thereby in the service and emergency piston chambers 6 and 35, respectively, is reduced, such reduction is effective through cavity 61 in slide valve 17 and passage 59 in diaphragm chamber 56 in the pressure device 48 and through passage 60 in diaphragm chamber 56 in the pressure device 49. Thus when the brake pipe pressure is reduced, the same reduction as occurs on the service and emergency pistons is effective in the diaphragm chambers 56 and when this reduction becomes sufficient with respect to the opposing auxiliary reservoir or quick action chamber pressure on the opposite side of the diaphragms 53 to overcome the force of springs 57, the pressure of said springs is removed from stem 11 and thereby piston 5 in the service application valve device 2 and from stem 42 and piston 34 in the emergency application valve device 3. With the force of springs 57 thus removed from the pistons 5 and 34 both pistons are completely freed for movement on obtaining the differential of pressures which they were designed to respond to.

As above mentioned, the service and emergency pistons may be designed to move from their normal positions when the brake pipe pressure on one side is reduced for instance one-half pound below that acting on the opposite side. Let it be assumed that a pressure of five pounds from the plungers 50 against the service and emergency piston stems is required to hold the heads of the service and emergency pistons against radial movement relative to the walls of their respective bores due to vibration as above described. To provide this pressure the pressure of the springs 57 on the diaphragms 53 will be five pounds. Now to completely remove the pressure of springs 57 from the piston heads before the one-half pound differential of fluid pressures is attained on the pistons upon a reduction in brake pipe pressure, the diaphragms 53 would be about three and five eighths inches in diameter. If the pressure of the springs 57 should be any less than that above mentioned the size of the diaphragms 53 could be correspondingly less, or these parts might even be so proportioned as to provide for relief of the pressure of said springs on the pistons even before the one-half pound reduction in brake pipe pressure were attained on the piston. In any case, it will be seen that the force of springs 57 for holding the heads of the service and emergency pistons against radial vibration in the cylinder bore when in their normal or release positions may be completely removed from the piston heads before or at least by the time the pistons are required to move upon a reduction in brake pipe pressure, whereby the pistons may operate normally and with the same degree of sensitivity for which they were originally designed.

The stops 58 in chambers 56 above the diaphragms 53 are provided for engagement by plates 46 to limit deflection of the diaphragms 53 in an upwardly direction. It will, however, be seen that the plungers 50 need not move with the diaphragms or even out of contact with the piston stems 11 and 42 in order to remove the pressure of the springs 57 from said stems, so that the clearance space between the stops 58 and plates 46 may be infinitely small.

If desired, a roller bearing 64 may be applied to the end of stem 50 in each of the pressure devices 48 and 49 for contacting the piston stems 11 and 42, as shown in Fig. 3 for contact with stem 11, in order to minimize resistance to movement of said stems relative to the respective plunger 50.

However, if it is desired that the plungers 50 move out of contact with the respective piston stems upon a reduction in brake pipe pressure the heads 52 of the plungers may be connected with the diaphragms 53 in any conventional manner, or as shown in Fig. 4, a light bias spring 63 may be provided in chamber 51 of each of the pressure devices 48 and 49 to act on the plunger head 52 to move the plunger 50 out of engagement with the respective piston stem whenever the brake pipe pressure at the opposite side of the diaphragm 53 is reduced.

Due to the fact that movement of the diaphragms 53 for controlling the plungers 50 may be infinitely small, it will be seen that these diaphragms may readily be made of flexible metal, such as bronze, with the assurance that they will last for an indefinite period. If it is desired, however, to use diaphragms of smaller area than the diaphragms 53 and which will have a correspondingly greater degree of deflection in use, the pressure devices 48 and 49 may be constructed as shown in Fig. 5 wherein the diaphragm indicated by the reference numeral 65 is preferably made of rubber. This diaphragm 65 is arranged for control by the same opposing pressures as diaphragms 53, i. e., of the brake pipe in a chamber 66 and of auxiliary reservoir in a chamber 67, as shown in the illustration applied to the service application valve device 2. In chamber 67 the diaphragm engages the head of a plunger 68 which extends through a suitable bore in the casing into valve chamber 9 wherein it engages one end of a lever 70. The opposite end of lever 70 is fulcrumed in the casing on a pin 71. Intermediate the ends of the lever is a fulcrum boss 72 disposed to engage the piston stem 11. In chamber 66 above the diaphragm 65 is a spring 73 corresponding in function to springs 57 in the structure shown in Figs. 1 and 2. The spring 73 exerts such a pressure on the diaphragm 65 and thereby through boss 72 on lever 70 as to urge the connected piston against the wall of the bore in which it is disposed with the same degree of force, as provided in the structures shown in Figs. 1 and 2 by springs 57. It will be seen that to attain the same force between boss 72 on the lever and the piston stem as attained between the plungers 50 and piston stems in the structure shown in Figs. 1 and 2, the spring 72 acting on the diaphragm 65 may exert a less force on the diaphragm 65 and a correspondingly smaller diaphragm is therefore required to offset this force upon a reduction in brake pipe pressure.

If desired, the boss 72 may be provided with a roller bearing 64 like shown in Fig. 3 for contact with the piston stem, or the connection between the end of the lever and the plunger 63 may be such as to disengage the boss 72 from the stem when the diaphragm 65 is deflected in an upwardly direction.

If any portion of the force of springs 57 or 73 were effective on a piston head urging same radially at the time the piston moved in response to a reduction in brake pipe pressure the piston would tend to scrape along one side of the piston bore and might cause wear which in turn would tend to cause unreliable operation of the devices. With the parts constructed as above described it will be seen that in use, no scraping of the pistons along the walls of the bores is likely to ever occur since the force of the springs 57 or 73 will always be removed from the piston stems at least by the time the differential between brake pipe pressure and the opposing pressure is obtained which the pistons were designed to respond to; and further because the resistance to deflection of the diaphragms 53 or 65 will remain substantially constant, whereas foreign matter which may accumulate around the pistons and rings may reduce the sensitivity of the pistons, so that a greater than intended differential of fluid pressures may be required for moving the pistons.

However, there is a remote possibility that the static resistance to movement of a piston and auxiliary slide valve may become reduced to a lower than normal degree in which case the piston might tend to move on a differential of fluid pressures lower than required to remove the force of the loading spring 57 or 73 from the piston head. The undesirable effect of such a condition on wear of the wall of the piston bore may however be minimized by controlling the connection between the diaphragm chambers 56 or 66 and the brake pipe through the auxiliary slide valve 20, so that the initial movement of the piston out of its normal release positions will cause complete removal of the force of the spring from the piston and thereby render the spring ineffective to cause wear of the piston bore during further movement of the piston. Such a structure is shown in Fig. 6 and will now be described.

As shown in Fig. 6, the main slide valve 17 is provided with ports 75 and 76 which connect passages 62 and 59 at the seat of said valve, in its release position, to the seat of the auxiliary slide valve 20. The auxiliary slide valve in turn is provided with a cavity 77 which in the normal position of said valve connects passages 75 and 76 to thereby connect the diaphragm chambers 56 or 66 to the brake pipe, with the parts of the device in their normal release position.

With this arrangement the pressure devices 48 and/or 49 and thereby the service and emergency application valve devices, if in proper condition, will operate in the same manner as before described. However, in case the static resistance to movement of the piston and auxiliary slide valve in the application valve devices is lower than normal, such that the pistons 5 and 34 tend to move before the force of the piston loading springs 57 or 73 is removed from the pistons as above described, the initial movement of the service piston 5 and thereby of the auxiliary slide valve 20 will break connection between the brake pipe and the diaphragm chambers 56 or 66 and connect said chambers to the atmosphere by way of passage 59, port 76 in the main slide valve 17, cavity 77 in the auxiliary slide valve 18, and a port 78 in the main slide valve to cavity 28 which is open to the atmosphere through passage 29. Fluid under pressure will therefore be promptly vented from the diaphragm chambers 56 or 66 so that auxiliary reservoir pressure acting on the opposite side of the diaphragms 53 and 65 may promptly remove the force of springs 57 or 73 from plungers 50 or 68 and thereby from the piston stems and piston heads. It will be noted that this removal of spring force from the pistons occurs during the initial movement thereof and while some scraping of the pistons against the walls of the bores in which they operate may occur during this initial movement it will be completely avoided during all further movement.

After the force of springs 57 or 73 has been removed from the service and emergency pistons 5 and 34 upon initiating a reduction in brake pipe pressure, it is desirable that the springs will be maintained in this condition until the pistons are returned to their normal positions shown, upon a subsequent complete recharging of the brake pipe and substantial complete release of brakes. In order to thus maintain the springs 57 or 73 ineffective after being rendered so upon initiating a reduction in brake pipe pressure, the brake cylinder release cavity 28 in the main slide valve is arranged to connect the passage 59 to the atmospheric port 29 in the slide valve seat upon movement of said slide valve out of release position so as to reduce the pressure in diaphragm chambers 56 or 66 to atmospheric pressure. The fluid pressure acting in chamber 51 or 67 at the lower side of diaphragms 53 or 65 will then maintain the loading springs 57 or 73 ineffective as long as the slide valve 17 is to the left of the position shown in the drawing. The service and emergency application valve devices will therefore operate as intended after the induction in brake pipe pressure has been initiated and will be returned to their normal release positions upon a subsequent increase in brake pipe pressure by the intended differential of fluid pressures on the piston for effecting a release of brakes. When the normal position of these pistons is thus attained, the diaphragm chambers 56 and 66 will be reconnected to the brake pipe through the cavity 61 in the main slide valve 17 or by cavity 77 in the auxiliary slide valve as shown in Fig. 6, so that said chambers will be recharged with fluid at brake pipe pressure which at this time is at least equal to the opposing pressure in chambers 51 acting on the diaphragms 53 or 65 so as to thereby render the springs 57 or 73 again effective to force the heads of the pistons against the walls of said bores for holding same against vibration.

As above described, the pistons and valves in the service and emergency application valve devices 2 and 3 have an inner position to which, under certain circumstances, they are moved against the opposing force of springs, such as spring 16 acting on plunger 14 shown in Fig. 2, and it will be noted that movement of the pistons from their application positions to this inner position is through the normal position in which the diaphragm chambers 56 or 66 will be opened to the brake pipe by way of the service slide valve 17 (Fig. 2) or said slide valve and the auxiliary valve 20 in the structure shown in Fig. 6. In case the pistons move to their inner positions as just mentioned, it would be undesirable to have the momentary connection between diaphragm chambers 56 or 66 and the brake pipe result in such recharging of said chambers as to render springs 57 or 73 effective to urge the pistons against their cylinder wall since this might result not only in delayed operation of the device but also in undesired scraping of the pistons against the walls during continued movement of the pistons to their inner positions and subsequent movement from their inner positions back to their normal positions.

The degree of pressure obtained in chambers 56 or 66 in the structures above described, as the slide valve 20 moves through its normal position to its inner position depends upon the rapidity of such movement and if sufficiently rapid may not be sufficient to permit springs 57 or 73 to become effective. However in order to ensure that these springs will not become effective during such movement, a choke 79 (Fig. 2) may be provided to so restrict the flow of fluid under pressure from the brake pipe through passages 62 and 59 to the diaphragm chambers 56 or 66, as the service piston 5 and main slide valve 17 move through their normal position to their inner position, that an insufficient increase in pressure will be attained in said chambers with respect to the opposing auxiliary reservoir pressure acting on the diaphragms to permit the piston loading springs to become effective to apply force to the pistons. In order that this choke will not act to restrict flow of fluid under pressure from the diaphragm chambers 56 or 66 in the direction of the brake pipe upon a reduction in brake pipe pressure a communication by-passing the choke 79 and containing a check valve 80 is provided.

To accomplish the same end as provided by choke 79, a check valve 81 may be provided in passage 55 to bottle fluid pressure in chamber 51 below the diaphragms 53, as shown in Fig. 7. This check valve 81 provides for charging of the diaphragm chambers 51 or 67 with fluid at brake pipe pressure when the service and emergency application valve devices are in their release position and is effective to hold this pressure in said chamber when an application of brakes is effective which causes a reduction in pressure in valve chambers 9 and 36. In effecting a release of an application of brakes, the service piston 5 will usually move from its application position through its normal or release position to its inner position upon an increase in brake pipe pressure to a degree less than full or normal brake pipe pressure, so even if the pressure in the diaphragm chambers 56 or 66 should become increased to that in the brake pipe as the main slide valve 17 passes through its normal or release position to its inner position, the higher pressure bottled in diaphragm chambers 51 or 67 by check valve 81 at this time will maintain the springs 57 or 73 ineffective.

If desired, the structure including check valve 81 (Fig. 7) may be used in connection with that including choke 79 and check valve 80 (Fig. 2) so that the restricted inflow of fluid to chambers 56 or 66 from the brake pipe by way of choke 79 may cooperate with the fluid pressure bottled in chamber 51 by check valve 81 to insure even a greater differential in pressures on the diaphragms 53 or 65 to hold the springs 57 or 73 ineffective then may be attained by use of only said choke or of only the check valve 81. Moreover, the restricted inflow of fluid to chamber 56 or 66 by choke 79 could offset a somewhat reduced pressure in diaphragm chambers 51 or 67 in case of leakage of fluid under pressure past the check valve 81 to the reduced pressure in valve chambers 9 or 36 while an application of brakes is effected.

The possibility of the pressure of fluid in diaphragm chambers 51 or 67 becoming reduced by leakage past the check valve 81 when the main slide valve 17 is out of its normal release position may be minimized by controlling communication between passage 55 and valve chamber 9 through the main slide valve 17, as shown in Fig. 8. In this modification the passage 55 is connected to the seating face of the main slide valve 17 and said valve is provided with a port 82 for registry with said passage only in the normal or release position of said valve. By this arrangement the passage 55 will be lapped by the slide valve 17 when out of its normal release position, and since a slide valve is more positive in preventing leakage than a check valve, it will be seen that the possibility of the pressure of fluid in diaphragm chambers 51 or 67 becoming reduced by leakage with the main slide valve moved out of its normal release position is very remote. A restriction 83 is provided in port 82 in order to restrict outflow of fluid from the diaphragm chambers 51 or 67 to valve chamber 9 as the main slide valve 17 moves through its normal position to its inner position so as to thereby insure maintenance of a sufficient degree of pressure in said diaphragm chambers to hold the loading springs 57 or 73 ineffective. With this structure the check valve 81 may be used in passage 55 together with the restriction 83 in port 82, if desired, to better insure the pressure in chambers 51 or 67 being maintained at their normal full degree during movement of the slide valve 17 through its normal position to its inner position.

*Summary*

From the above description it will now be seen that I have provided loading means for holding a piston head against the wall of its cylinder bore for preventing vibration between the piston and wall and grooving of the wall which might interfere with or prevent intended operation of a device or even result in undesired operation. The loading means is effective to hold the piston against vibration only in its normal position and may be rendered ineffective at least by the time the piston is required to operate and may then be maintained ineffective in all other positions so that the piston and other parts of the device controlled by the piston may operate in response to the differential in fluid pressures for which it was designed. In other words, the piston loading means while accomplishing the desired end, is so controlled as to interfere in no way with the normal operation of the device.

In structures embodying separate service and emergency application valve devices such as the well known "AB" brake, a separate piston loading means may be applied to each of the valve devices and both means may be controlled from either one of the valve devices or each may be controlled from its respective valve device. In the drawings this control of the two piston loading means is shown and has been above described as associated with the service application valve device. It will, however, be apparent that such control could as well be from the emergency application valve device or if desired each piston loading means could be controlled from its respective valve device.

Having now described my invention, what I claim as new and desire to secure by Letters Patent is:

1. In combination, a casing having a piston bore, a piston disposed to reciprocate in said bore and comprising a piston head, pressure means in said casing arranged to act on said piston head to urge same radially against the wall of said bore, and means controlled by said piston operative to render said pressure means ineffective upon movement of said piston.

2. In combination, a casing having a piston bore, a piston in said bore, comprising a piston head, said piston being subject on opposite sides to opposing fluid pressures and arranged to be moved in said bore by a certain differential between said fluid pressures, pressure means in said casing arranged to act on said piston head to urge same radially against the wall of said bore, and means subject to said opposing fluid pressures and operative by a differential between such pressures not exceeding said certain differential to remove the force of said pressure means from said piston head.

3. In combination, a casing having a piston bore, a piston in said bore comprising a piston head, said piston being subject on opposite sides to opposing fluid pressures and arranged to be moved in said bore by a certain differential between said fluid pressures, pressure means in said casing arranged to act on said piston head to urge same radially against the wall of said bore, means normally subject to said opposing fluid pressure and operative by a differential between said pressures not exceeding said certain differential to remove the force of said pressure means from said piston head, and a valve operative by said piston upon movement in response to said certain differential in fluid pressures to effect operation of said means to maintain said pressure means ineffective.

4. In combination, a casing having a piston bore, a piston comprising a piston head and disposed to reciprocate in said bore and having a plurality of different operating positions in said bore, pressure means in said casing arranged to act on said piston head for urging same against the wall of said bore, and means controlled by said piston operative to render said pressure means effective in one of said positions and ineffective in all other of said positions.

5. In combination, a casing having a piston bore, a piston comprising a piston head and disposed to reciprocate in said bore and having a plurality of different operating positions in said bore, pressure means in said casing arranged to act on said piston head for urging same against the wall of said bore, and means controlled by said piston operative to render said pressure means effective in one of said positions and ineffective upon movement of said piston out of said one position.

6. In combination, a casing having a piston bore, a piston comprising a piston head and disposed to reciprocate in said bore and having a plurality of different operating positions in said bore, pressure means in said casing arranged to act on said piston head for urging same against the wall of said bore, and means controlled by said piston operative to render said pressure means effective in an intermediate one of said positions and ineffective in all other of said positions.

7. In combination, a casing having a piston bore, a piston comprising a piston head and disposed to reciprocate in said bore and having a plurality of different operating positions in said bore, pressure means in said casing arranged to act on said piston head for urging same against the wall of said bore, and means controlled by said piston operative to render said pressure means effective in an intermediate one of said positions and ineffective upon movement of said piston out of said intermediate position in either direction to another of said positions and to maintain said pressure means ineffective upon movement of said piston from a position at one side of said intermediate position through said intermediate position to a position at the opposite side of said intermediate position.

8. In combination, a plurality of piston bores, a piston in each of said bores comprising a piston head, all of said pistons being subject on one side to a certain fluid pressure and on the opposite side to an opposing fluid pressure and being movable in said bores upon creation of a certain differential between the opposing fluid pressures, pressure means for each piston head operative to urge same against the wall of its bore, and means controlling said pressure means for all of said piston heads subject to the same opposing fluid pressures as one of the pistons and operative by a differential not exceeding said certain differential to render all of the pressure means ineffective.

9. In combination, a plurality of piston bores, a piston disposed to reciprocate in each of said bores and each piston having a plurality of different operating positions in its bore, and comprising a piston head, pressure means for each piston head arranged to act thereon for urging same against the wall of its bore, and means controlled by one of said pistons operative to render said pressure means for all of said piston heads effective in one position of said one piston and ineffective in all other positions of said one piston.

10. In combination, a plurality of piston bores, a piston disposed to reciprocate in each of said bores and each piston having a plurality of different operating positions in its bore, and comprising a piston head, pressure means for each piston head arranged to act thereon for urging same against the wall of its bore, and means controlled by one of said pistons operative to render said pressure means for all of said piston heads effective in an intermediate position of said one piston and ineffective upon movement of said one piston out of its intermediate position in either direction to another operating position and to maintain said pressure means for all of said piston heads ineffective upon movement of said one piston from a position at one side of said intermediate position through said intermediate position to a position at the opposite side of said intermediate position.

11. In combination, a casing having a piston bore, a piston comprising a piston head disposed to reciprocate in said bore and having a plurality of different operating positions therein, spring means under pressure, means connecting said spring means and piston for applying the force of said spring means to said piston head for urging said piston head against the wall of said bore, a movable abutment operable when subject to a certain fluid pressure to render said spring means effective and upon a reduction in the pressure of such fluid to render said spring means ineffective, and means controlled by said piston controlling the pressure of fluid on said abutment and providing for attainment of said certain fluid pressure only in one position of said piston and a reduction in such pressure in all other positions of said piston.

12. In combination, a casing having a piston bore, a piston disposed in said bore and comprising a piston head, said piston being subject on opposite faces to opposing fluid pressures and being movable from a normal position to another position upon a certain degree of reduction in one of said pressures below the opposing pressure, spring means under pressure, means connecting said spring means and piston head for applying the pressure of said spring means to said piston head to urge said piston head against the wall of said bore, and a movable abutment subject to said opposing fluid pressures for controlling said spring means and operative upon substantial equalization of said fluid pressures to render said spring means effective and upon a reduction in said one fluid pressure no greater than said certain degree to render said spring means ineffective.

13. In combination, a casing having a piston bore, a piston disposed in said bore and comprising a piston head, said piston being subject on opposite faces to opposing fluid pressures and being movable from a normal position to another position upon a certain degree of reduction in one of said pressures below the opposing pressure, spring means under pressure, means connecting said spring means and piston head for applying the pressure of said spring means to said piston head to urge said piston head against the wall of said bore, a movable abutment subject in one chamber to one of said fluid pressures and in a second chamber to the other fluid pressure and operative upon substantial equalization of fluid pressures in both of said chambers to render said spring means effective and upon a reduction in fluid pressure in said one chamber to render said spring means ineffective, and valve means controlled by said piston controlling the pressures of fluid in said one chamber and providing in the normal position of said piston for the pressure in said one chamber reducing with said one fluid pressure and in the other position of said piston opening said one chamber to atmosphere.

14. In combination, a casing having a piston bore, a piston disposed in said bore and comprising a piston head, said piston being subject on opposite faces to opposing fluid pressures and being movable from a normal position to another position upon a certain degree of reduction in one of said pressures below the opposing pressure, and being movable back to normal position upon an increase in said one pressure over said opposing pressure, spring means under pressure, means connecting said spring means and piston head for applying the pressure of said spring means to said piston head to urge said piston head against the wall of said bore, and a movable abutment normally subject to said opposing fluid pressures for controlling said spring means and operative upon substantial equalization of said fluid pressures to render said spring means effective and upon a reduction in said one pressure no greater than said certain degree to render said spring means ineffective, and means controlled by said piston arranged to maintain said one fluid pressure reduced in said other position of said piston and providing for equalization of said opposing fluid pressures on said abutment only with said piston in said normal position.

15. In combination, a casing having a bore, a piston mounted to reciprocate in said bore and comprising a piston head, said piston having a normal position and another position in said bore and being controlled by the opposing fluid pressures in a chamber and in a pipe and being movable from said normal position to said other position upon a certain reduction in pressure in said pipe below the pressure in said chamber and from said other position to said normal position upon an increase in pressure in said pipe to a degree above that in said chamber, spring means under pressure, means including a movable abutment connecting said spring means and piston head, said movable abutment being normally subject on opposite faces to the opposing pressures of fluid in said chamber and pipe and being operative upon equalization of said pressures to render said spring means effective to urge said piston head radially against the wall of said bore, and being also operative upon a reduction in pressure in said pipe of a degree no greater than said certain degree below the pressure in said chamber to relieve the pressure of said spring means on said piston head.

16. In combination, a casing having a bore, a piston mounted to reciprocate in said bore and comprising a piston head, said piston having a normal position and another position in said bore and being controlled by the opposing fluid pressures in a chamber and in a pipe and being movable from said normal position to said other position upon a certain reduction in pressure in said pipe below the pressure in said chamber and from said other position to said normal position upon an increase in pressure in said pipe to a degree above that in said chamber, spring means under pressure, means including a movable abutment connecting said spring means and piston head, said movable abutment being normally subject on opposite faces to the opposing pressures of fluid in said chamber and pipe and being operative upon equalization of said pressures to render said spring means effective to urge said piston head radially against the wall of said bore, and being also operative upon a reduction in pressure in said pipe of a degree no greater than said certain degree below the pressure in said chamber to relieve the pressure of said spring means on said piston head, and valve means controlled by said piston for controlling communication between said pipe and one face of said movable abutment and opening said communication in the normal position of said valve means, said valve means upon movement out of normal position closing said communication and disconnecting the one face of said movable abutment from said pipe and opening same to atmosphere.

17. In combination, a casing having a bore, a piston mounted to reciprocate in said bore and comprising a piston head, said piston having a normal position and another position in said bore and being controlled by the opposing fluid pressures in a chamber and in a pipe and being movable from said normal position to said other position upon a certain reduction in pressure in said pipe below the pressure in said chamber and from said other position to said normal position upon an increase in pressure in said pipe to a degree above that in said chamber, spring means under pressure, means including a movable abutment connecting said spring means and piston head, said movable abutment being normally subject on opposite faces to the opposing pressures of fluid in said chamber and pipe and being operative upon equalization of said pressures to render said spring means effective to urge said piston head radially against the wall of said bore, and being also operative upon a reduction in pressure in said pipe of a degree no greater than said certain degree below the pressure in said chamber to relieve the pressure of said spring means on said piston head, a main slide valve, an auxiliary slide valve mounted to slide on said main slide valve, said piston being connected to said valves in such a manner that upon movement of said piston from normal position to its other position the auxiliary slide valve is first moved from a normal position relative to the main slide valve and then the main slide valve is moved from a normal position, said valves controlling communication between said pipe and the one side of said movable abutment and opening said communication in the normal position of both said main and auxiliary slide valves and closing same upon movement of said auxiliary slide valve out of its normal position relative to said main slide valve, said auxiliary slide valve upon movement out of its normal position also opening said one side of said movable abutment to atmosphere and said main slide valve upon movement out of its normal position maintaining said one side of said abutment open to atmosphere.

18. In combination, a casing having a piston bore, a piston comprising a piston head mounted to reciprocate in said bore, said piston being controlled by the opposing pressures of fluid in a pipe and a chamber and being movable upon a certain reduction in pressure in said pipe below that in said chamber out of a normal position in one direction to a second position for reducing the pressure in said chamber and being movable back to said normal position upon a certain increase in pressure in said pipe above that in said chamber and being movable from said second position through said normal position to a third position upon a greater increase in pressure in said pipe above that in said valve chamber and being operative in both said third position and said normal position to supply fluid under pressure from said pipe to said chamber, means arranged to oppose movement of said piston from said normal position to said third position and to move said piston from said third position back to said normal position upon substantial equalization of the fluid pressures in said pipe and chamber, spring means for urging said piston head against the wall of said piston bore, means including a movable abutment connecting said spring means with said piston head, said movable abutment being subject on one side to the pressure of fluid in a volume open to said chamber and on the opposite side to the opposing pressure of fluid in a second chamber and being operative upon substantial equalization of such opposing pressures to render said spring means effective and upon a reduction in fluid pressure in said second chamber no greater than said certain degree of reduction in pressure in said pipe to render said spring means ineffective, and valve means arranged for movement by said piston upon movement to its different positions and operative with said piston in its normal position to open communication between said pipe and said second chamber to render said spring means effective, said valve means being operative in all other positions of said piston to close said communication and to vent fluid under pressure from said second chamber to render said spring means ineffective.

19. In combination, a casing having a piston bore, a piston comprising a piston head mounted to reciprocate in said bore, said piston being controlled by the opposing pressures of fluid in a pipe and a chamber and being movable upon a certain reduction in pressure in said pipe below that in said chamber out of a normal position in one direction to a second position for reducing the pressure in said chamber and being movable back to said normal position upon a certain increase in pressure in said pipe above that in said chamber and being movable from said second position through said normal position to a third position upon a greater increase in pressure in said pipe above that in said valve chamber and being operative in both said third position and said normal position to supply fluid under pressure from said pipe to said chamber, means arranged to oppose movement of said piston from said normal position to said third position and to move said piston from said third position back to said normal position upon substantial equalization of the fluid pressures in said pipe and chamber, spring means for urging said piston head against the wall of said piston bore, means including a movable abutment connecting said spring means with said piston head, said movable abutment being subject on one side to the pressure of fluid in a volume open to said chamber and on the opposite side to the opposing pressure of fluid in a second chamber and being operative upon substantial equalization of such opposing pressures to render said spring means effective and upon a reduction in fluid pressure in said second chamber no greater than said certain degree of reduction in pressure in said pipe to render said spring means ineffective, valve means arranged for movement by said piston upon movement to its different positions and operative with said piston in its normal position to open communication between said pipe and said second chamber to render said spring means effective, said valve means being operative in all other positions of said piston to close said communication and to vent fluid under pressure from said second chamber to render said spring means ineffective, and means arranged to maintain said spring means ineffective upon movement of said piston from said second position through said normal position to said third position.

20. In combination, a casing having a piston bore, a piston comprising a piston head mounted to reciprocate in said bore, said piston being controlled by the opposing pressures of fluid in a pipe and a chamber and being movable upon a certain reduction in pressure in said pipe below that in said chamber out of a normal position in one direction to a second position for reducing the pressure in said chamber and being movable back to said normal position upon a certain increase in pressure in said pipe above that in said chamber and being movable from said second position through said normal position to a third position upon a greater increase in pressure in said pipe above that in said valve chamber and being operative in both said third position and said normal position to supply fluid under pressure from said pipe to said chamber, means arranged to oppose movement of said piston from said normal position to said third position and to move said piston from said third position back to said normal position upon substantial equalization of the fluid pressures in said pipe and chamber, spring means for urging said piston head against the wall of said piston bore, means including a movable abutment connecting said spring means with said piston head, said movable abutment being subject on one side to the pressure of fluid in a volume open to said chamber and on the opposite side to the opposing pressure of fluid in a second chamber and being operative upon substantial equalization of such opposing pressures to render said spring means effective and upon a reduction in fluid pressure in said second chamber no greater than said certain degree of reduction in pressure in said pipe to render said spring means ineffective, valve means arranged for movement by said piston upon movement to its different positions and operative with said piston in its normal position to open communication between said pipe and said second chamber to render said spring means effective, said valve means being operative in all other positions of said piston to close said communication and to vent fluid under pressure from said second chamber to render said spring means ineffective, a check valve in said communication providing for the pressure in said second chamber reducing with the pressure in said pipe but arranged to prevent flow of fluid under pressure in the opposite direction, and a restricted air-flow communication around said check valve for limiting flow of fluid under pressure from said pipe to said second chamber with said piston in said normal position to such a degree as to provide for said abutment being operative by the pressure of fluid in said volume to maintain said spring means ineffective upon movement of said piston through said normal position to said last named position.

21. In combination, a casing having a piston bore, a piston comprising a piston head mounted to reciprocate in said bore, said piston being controlled by the opposing pressures of fluid in a pipe and a chamber and being movable upon a certain reduction in pressure in said pipe below that in said chamber out of a normal position in one direction to a second position for reducing the pressure in said chamber and being movable back to said normal position upon a certain increase in pressure in said pipe above that in said chamber and being movable from said second position through said normal position to a third position upon a greater increase in pressure in said pipe above that in said valve chamber and being operative in both said third position and said normal position to supply fluid under pressure from said pipe to said chamber, means arranged to oppose movement of said piston from said normal position to said third position and to move said piston from said third position back to said normal position upon substantial equalization of the fluid pressures in said pipe and chamber, spring means for urging said piston head against the wall of said piston bore, means including a movable abutment connecting said spring means with said piston head, said movable abutment being subject on one side to the pressure of fluid in a volume open to said chamber and on the opposite side to the opposing pressure of fluid in a second chamber and being operative upon substantial equalization of such opposing pressures to render said spring means effective and upon a reduction in fluid pressure in said second chamber no greater than said certain degree of reduction in pressure in said pipe to render said spring means ineffective, valve means arranged for movement by said piston upon movement to its different positions and operative with said piston in its normal position to open communication between said pipe and said second chamber to render said spring means effective, said valve means being operative in all other positions of said piston to close said communication and to vent fluid under pressure from said second chamber to render said spring means ineffective, a check valve in the communication between said volume and the first named chamber providing for charging of said volume with fluid at the maximum degree of pressure attained in said first named chamber and operative to hold such pressure in said volume upon the pressure of fluid in said first named chamber being reduced by movement of said piston out of normal position to thereby actuate said abutment to maintain said spring mans ineffective against fluid pressure supplied from said pipe to said second chamber through said valve means upon movement of said valve means with said piston from said second position through said normal position to said third position.

22. In combination, a casing having a piston bore, a piston comprising a piston head mounted to reciprocate in said bore, said piston being controlled by the opposing pressures of fluid in a pipe and a chamber and being movable upon a certain reduction in pressure in said pipe below that in said chamber out of a normal position in one direction to a second position for reducing the pressure in said chamber and being movable back to said normal position upon a certain increase in pressure in said pipe above that in said chamber and being movable from said second position through said normal position to a third position upon a greater increase in pressure in said pipe above that in said valve chamber and being operative in both said third position and said normal position to supply fluid under pressure from said pipe to said chamber, means arranged to oppose movement of said piston from said normal position to said third position and to move said piston from said third position back to said normal position upon substantial equalization of the fluid pressures in said pipe and chamber, spring means for urging said piston head against the wall of said piston bore, means including a movable abutment connecting said spring means with said piston head, said movable abutment being subject on one side to the pressure of fluid in a volume open to said chamber and on the opposite side to the opposing pressure of fluid in a second chamber and being operative upon substantial equalization of such opposing pressures to render said spring means effective and upon a reduction in fluid pressure in said second chamber no greater than said certain degree of reduction in pressure in said pipe to render said spring means ineffective, valve means arranged for movement by said piston upon movement to its different positions and operative with said piston in its normal position to open communication between said pipe and said second chamber to render said spring means effective, said valve means being operative in all other positions of said piston to close said communication and to vent fluid under pressure from said second chamber to render said spring means ineffective, communication between said volume and said first named chamber being controlled by said valve means and opened in the normal position of said piston and closed in all other positions, and a restriction in the last named communication for retarding flow of fluid from said volume to the first named chamber upon movement of said valve means by said piston as said piston moves from said second position through normal position to said third position to such a degree as to maintain the pressure of fluid in said volume sufficiently above that in said second chamber to actuate said abutment for maintaining said spring means ineffective against fluid under pressure supplied from said pipe to the second named chamber as said valve means is moved with said piston through said normal position to said third position.

23. In combination, a casing having a piston bore, a piston disposed to reciprocate in said bore, said piston being subject to the opposing pressures of fluid in a valve chamber and in a pipe and being arranged to move from one position to another upon a certain degree of reduction in pressure in said pipe with respect to the opposing pressure in said chamber, said piston comprising a piston head and a stem projecting from one face thereof, a movable abutment subject on one face to pressure of fluid in said valve chamber and having at the opposite side a spring chamber, a spring under pressure in said spring chamber acting on one side of said abutment, a plunger engaging the opposite side of said abutment and arranged to transmit pressure of said spring to said stem for urging said piston head into engagement with the wall of said bore, and means providing a connection between said spring chamber and pipe for varying the pressure of fluid in said spring chamber with variations in said pipe, said abutment being operative upon equalization of pressures in said spring chamber and pipe to transmit force of said spring to said plunger for rendering said spring effective to urge said piston head into contact with said wall and being operative upon a reduction in pressure in said pipe of a degree not exceeding said certain degree to render said spring ineffective.

24. In combination, a casing having a piston bore, a piston disposed to reciprocate in said bore, said piston being subject to the opposing pressures of fluid in a valve chamber and in a pipe and being arranged to move from one position to another upon a certain degree of reduction in pressure in said pipe with respect to the opposing pressure in said chamber, said piston comprising a piston head and a stem projecting from one face thereof, a movable abutment subject on one face to pressure of fluid in said valve chamber and having at the opposite side a spring chamber, a spring under pressure in said spring chamber acting on one side of said abutment, a plunger engaging the opposite side of said abutment and arranged to transmit pressure of said spring to said stem for urging said piston head into engagement with the wall of said bore, means providing a connection between said spring chamber and pipe for varying the pressure of fluid in said spring chamber with variations in said pipe, said abutment being operative upon equalization of pressures in said spring chamber and pipe to transmit force of said spring to said plunger for rendering said spring effective to urge said piston head into contact with said wall and being operative upon a reduction in pressure in said pipe of a degree not exceeding said certain degree to render said spring ineffective, and an anti-friction bearing carried by said plunger and engaging said stem.

25. In combination, a casing having a piston bore, a piston disposed to reciprocate in said bore, said piston being subject to the opposing pressures of fluid in a valve chamber and in a pipe and being arranged to move from one position to another upon a certain degree of reduction in pressure in said pipe with respect to the opposing pressure in said chamber, said piston comprising a piston head and a stem projecting from one face thereof, a movable abutment subject on one face to pressure of fluid in said valve chamber and having at the opposite side a spring chamber, a spring under pressure in said spring chamber acting on one side of said abutment, a plunger engaging the opposite side of said abutment, a lever having a fulcrum connection with said casing and an operating connection with said plunger and a third point of connection with said stem and operative to transmit the pressure of said spring to said stem and thereby said piston head for urging said head against the wall of said bore, and means providing a connection between said spring chamber and pipe for varying the pressure of fluid in said spring chamber with that in said pipe, said abutment being operative upon equalization of pressures in said spring chamber and pipe to render said spring effective and being operative to counteract the pressure of said spring upon a reduction in pressure in said pipe no greater than said certain reduction.

26. In a fluid pressure brake, the combination with a brake pipe, of a brake controlling valve device comprising a casing having a piston bore and a valve chamber, a piston mounted to reciprocate in said bore, a valve in said chamber arranged for movement by said piston, said piston having a normal position for supplying fluid under pressure from said brake pipe to said chamber and being movable out of said normal position to a second position upon a certain reduction in brake pipe pressure below the opposing pressure of fluid in said chamber for releasing fluid under pressure from said chamber, said piston being operative upon a certain increase in brake pipe pressure above that in said chamber to move said piston and valve from said second position back to said normal position and upon a greater increase in brake pipe pressure above that in said chamber through said normal position to an inner position, spring means arranged to oppose movement of said piston and valve from said normal position to said inner position and operative upon substantial equalization of the opposing fluid pressures on said piston to return said piston to said normal position, said piston comprising a piston head and a stem connecting same with said valve, a movable abutment in said casing having at one side a chamber arranged to be charged with fluid under pressure from said valve chamber and having at the opposite side a spring chamber, a spring in said spring chamber, a plunger interposed between the opposite side of said abutment and said stem arranged to transmit pressure of said spring to said stem and thereby said piston head for urging said piston head against the wall of said bore, said valve in the normal position of said piston opening communication between said spring chamber and brake pipe to provide for variations in pressure in said chamber with variations in pressure in said brake pipe, said spring being operative upon equalization of the opposing pressures on said abutment to urge said piston head against the wall of said bore, and said abutment being operative upon a reduction in brake pipe pressure effective in said spring chamber of a degree no greater than required for moving said piston out of normal position to relieve said stem of pressure from said spring, said valve in all positions of said piston out of normal position venting said spring chamber to thereby maintain said spring ineffective, and means arranged to control the pressure of fluid at either one side or the other of said abutment means upon movement of said piston from said second position through said normal position to said inner position to maintain the differential of pressures on said abutment means sufficient to maintain said spring means ineffective.

27. In a fluid pressure brake, in combination, a brake pipe, a brake controlling valve device comprising a service application portion, and an emergency application portion, both of said portions comprising a piston mounted to reciprocate in a bore, a valve disposed in a valve chamber at one side of said piston and a stem connecting said valve to said piston for movement by said piston, each of said pistons being open at the opposite side to said brake pipe and operative upon a certain degree of reduction in brake pipe pressure below that in said valve chamber to move from a normal position to another position for operating said valve to a corresponding position for releasing fluid under pressure from the respective valve chamber and being operative upon a subsequent increase in brakepipe pressure at a certain rate to return to said normal position and thereby return said valve to a corresponding position and being movable through said normal position to an inner position in case the increase in brake pipe pressure is at a greater rate for correspondingly positioning said valve and being operative in both said normal and inner positions for supplying fluid under pressure from said brake pipe to said valve chamber, a spring arranged to oppose movement of each of said pistons from its normal position to its inner position and operative upon substantial equalization of opposing fluid pressures on the piston for returning same to its normal position, each of said portions further comprising a movable abutment subject on one side to pressure of fluid in said valve chamber and having at the opposite side a control chamber, a spring under pressure in said control chamber acting on said abutment, a plunger slidably mounted in said casing between said one side of said abutment and piston stem for transmitting pressure of said spring to said stem and thereby to said piston for urging the head of said piston radially into contact with the wall of its bore, a communication connecting the control chambers in the two portions of said brake controlling valve device, said valve in one of said portions and in the normal position of the respective piston connecting said communication to said brake pipe to provide for charging of both of said control chambers with fluid at brake pipe pressure and to provide for reducing the pressure in said control chambers with brake pipe pressure upon a reduction in brake pipe pressure, said abutments being operative by pressure of fluid from said valve chambers upon a reduction in brake pipe pressure in said control chambers to relieve the pressure of said spring means on said piston stems, said valve in all other positions of said piston opening said communication and thereby said control chambers to atmosphere to maintain said spring in both of said portions ineffective.

RALPH T. WHITNEY.